US009748885B2

(12) United States Patent
Brier et al.

(10) Patent No.: US 9,748,885 B2
(45) Date of Patent: Aug. 29, 2017

(54) REGENERATIVE ENERGY SYSTEM FOR GROUND TRANSPORTATION VEHICLES

(71) Applicant: Paramount Pictures Corporation, Los Angeles, CA (US)

(72) Inventors: Margaret G. Brier, Maplewood, NJ (US); John K. Buyco, Seattle, WA (US); Chelsea R. Fischbach, San Diego, CA (US); Scott M. Ogilvie, Sleepy Hollow, IL (US); Johnson Qu, Arlington, MA (US); Ayyappa P. Vemulkar, Bangalore (IN)

(73) Assignee: PARAMOUNT PICTURES CORPORATION, Hollywood, CA (US)

( * ) Notice: Subject to any disclaimer, the term of this patent is extended or adjusted under 35 U.S.C. 154(b) by 0 days.

(21) Appl. No.: 15/265,274

(22) Filed: Sep. 14, 2016

(65) Prior Publication Data
US 2017/0005607 A1    Jan. 5, 2017

Related U.S. Application Data

(60) Continuation of application No. 14/733,469, filed on Jun. 8, 2015, now Pat. No. 9,457,687, which is a
(Continued)

(51) Int. Cl.
*H02P 25/00* (2006.01)
*H02P 25/06* (2016.01)
(Continued)

(52) U.S. Cl.
CPC ............... *H02P 25/06* (2013.01); *B60L 3/12* (2013.01); *B60L 7/10* (2013.01); *B60L 7/14* (2013.01);
(Continued)

(58) Field of Classification Search
CPC ................................. B60L 13/03; H02P 25/06
(Continued)

(56) References Cited

U.S. PATENT DOCUMENTS 3,847,089 A * 11/1974 Nelson ........................ 104/291
4,092,554 A *  5/1978 Quinn ......................... 104/292
(Continued)

FOREIGN PATENT DOCUMENTS

JP        51-076720        7/1976
JP        58-192405       11/1983
(Continued)

*Primary Examiner* — Jason C Smith
(74) *Attorney, Agent, or Firm* — Fay Kaplun & Marcin, LLP

(57) ABSTRACT

Present example embodiments relate generally to a ground transportation system for interacting with one or more vehicles, the vehicle comprising at least one magnetic element fixedly attached to the vehicle, each magnetic element operable to generate a magnetic field having a first magnitude and a first direction, the system comprising a magnetic coil assembly fixedly positioned near an area traversable by the vehicle and comprising a core and a magnetic wire coil wrapped around the core, the magnetic coil assembly operable to generate a magnetic field having a second magnitude and a second direction; and an energy storage unit operable to release energy to and store energy from the magnetic coil assembly.

12 Claims, 7 Drawing Sheets

Related U.S. Application Data division of application No. 13/684,210, filed on Nov. 22, 2012, now Pat. No. 9,050,896.

(51) Int. Cl.
 *B60L 13/03* (2006.01)
 *B60L 7/10* (2006.01)
 *B60L 7/14* (2006.01)
 *B60L 7/26* (2006.01)
 *B60L 7/28* (2006.01)
 *B60L 11/18* (2006.01)
 *H02P 3/14* (2006.01)
 *B60L 15/20* (2006.01)
 *B60L 3/12* (2006.01)
 *B60L 15/00* (2006.01)

(52) U.S. Cl.
 CPC ............ *B60L 7/26* (2013.01); *B60L 7/28* (2013.01); *B60L 11/1803* (2013.01); *B60L 13/03* (2013.01); *B60L 15/005* (2013.01); *B60L 15/20* (2013.01); *H02P 3/14* (2013.01); *B60L 2200/12* (2013.01); *B60L 2200/26* (2013.01); *B60L 2200/36* (2013.01); *B60L 2220/12* (2013.01); *B60L 2240/12* (2013.01); *B60L 2240/14* (2013.01); *Y02T 10/644* (2013.01); *Y02T 10/645* (2013.01); *Y02T 10/7005* (2013.01); *Y02T 10/7275* (2013.01)

(58) Field of Classification Search
 USPC ................................. 104/290, 292; 191/10
 See application file for complete search history.

(56) References Cited

U.S. PATENT DOCUMENTS

| | | | | |
|---|---|---|---|---|
| 5,809,897 | A  * | 9/1998 | Powell et al. | 104/282 |
| 5,959,382 | A  * | 9/1999 | Dauwalter | 310/90.5 |
| 7,096,794 | B2 * | 8/2006 | Post | 104/281 |
| 8,069,792 | B2 * | 12/2011 | Shapery | 104/287 |
| 8,683,926 | B2 * | 4/2014 | Shapery et al. | 104/284 |
| 2008/0011184 | A1 | 1/2008 | Lopatinsky et al. | |
| 2008/0106155 | A1* | 5/2008 | Yamada et al. | 310/12 |
| 2009/0032350 | A1* | 2/2009 | Shapery | 191/10 |
| 2010/0219610 | A1* | 9/2010 | Shapery et al. | 280/423.1 |
| 2010/0294161 | A1* | 11/2010 | Bavaresco et al. | 104/89 |
| 2011/0052317 | A1* | 3/2011 | Jeter et al. | 404/73 |
| 2011/0100252 | A1* | 5/2011 | Fukukawa | 104/293 |
| 2012/0193172 | A1* | 8/2012 | Matscheko et al. | 187/289 |
| 2013/0193276 | A1* | 8/2013 | Hunter | 246/122 R |
| 2014/0007788 | A1* | 1/2014 | Bavaresco et al. | |
| 2014/0137763 | A1* | 5/2014 | Brier et al. | 104/290 |

FOREIGN PATENT DOCUMENTS

| | | |
|---|---|---|
| JP | 60-261302 | 12/1985 |
| JP | 64-12803 | 1/1989 |
| JP | 04-140003 | 5/1992 |
| JP | 04-365722 | 12/1992 |
| JP | 08-280103 | 10/1996 |
| JP | 11-205911 | 7/1999 |
| JP | 11-299010 | 10/1999 |
| JP | 2003-189417 | 7/2003 |
| WO | 2007/063693 | 7/2007 |

* cited by examiner

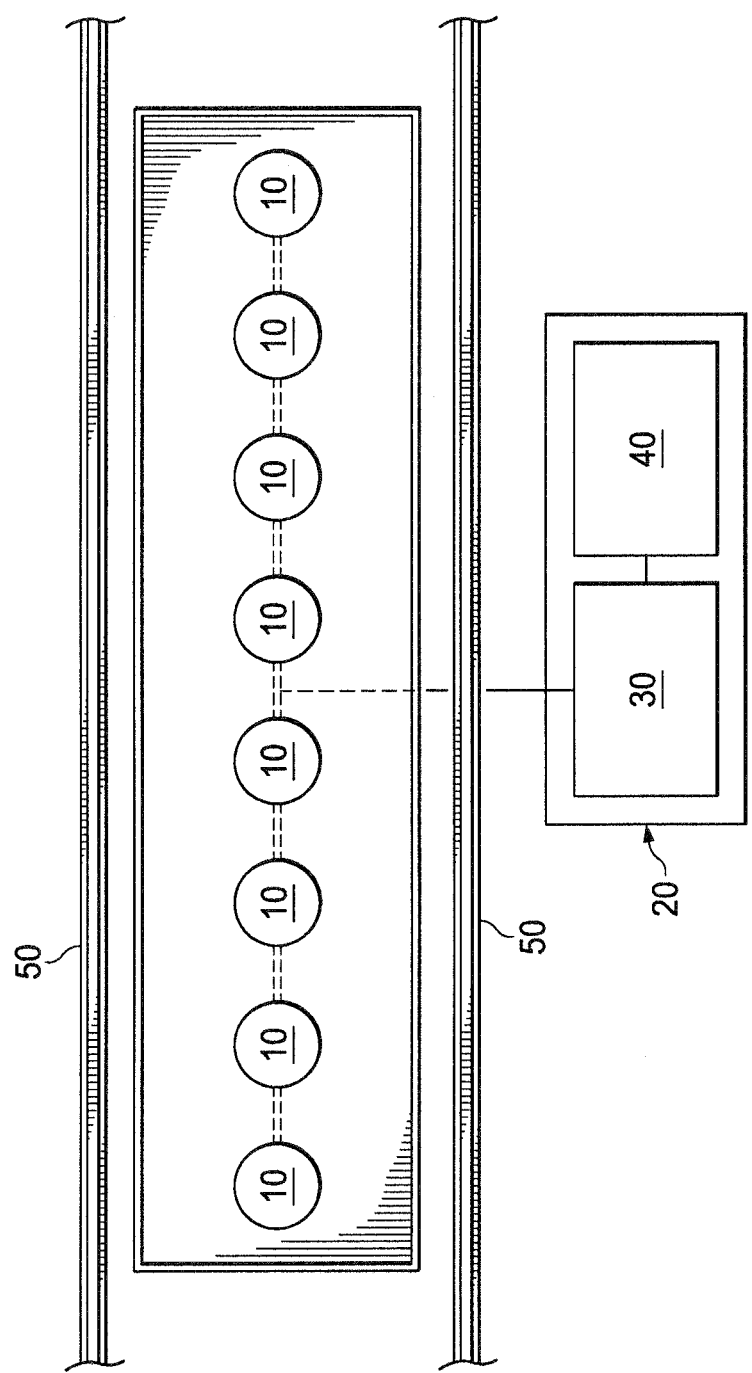

REGENERATIVE ENERGY SYSTEM FOR GROUND TRANSPORTATION VEHICLES

PRIORITY CLAIM

The present application is a Continuation Application of U.S. NonProvisional patent application Ser. No. 14/733,469 filed on Jun. 8, 2015, now U.S. Pat. No. 9,457,687; which is a Divisional Application of U.S. NonProvisional patent application Ser. No. 13/684,210 filed on Nov. 22, 2012, now U.S. Pat. No. 9,050,896. The entire disclosure of these prior applications/patents are considered as being part of the disclosure of the accompanying application and hereby expressly incorporated by reference herein.

TECHNICAL FIELD

The present disclosure relates generally to ground transportation vehicles, including those for use in fixed, variably fixed, and unfixed routes, such as trains, roller coasters, and other ground transportation vehicles.

BACKGROUND

Ground transportation vehicles, including those that operate on the ground and above or under the ground (examples include those that travel in, on, and/or through roads, bridges, rail systems, tunnels, water, and levitated above ground such as MagLev trains) (hereinafter "ground transportation vehicles"), are used in a multitude of applications based on, among other things, user requirements, budgets, and intended or anticipated use. As such, ground transportation vehicles will comprise fundamentally distinct underlying technologies.

Automated and semi-automated ground transportation vehicles are generally used in applications that require transporting of cargo and/or persons along one or more fixed or variably fixed routes. For example, trains have been widely employed for use in transporting cargo and/or persons between two or more points, such as stations, along fixed or variably fixed routes. Oftentimes, the route of ground transportation vehicles are formed in a closed-ended or open-ended manner so as to return the ground transportation vehicles back to the same point of origin. In such applications, the ground transportation vehicles along such routes may stop at one or more points in between the point of origin, or may not stop at all. For example, public commuter trains traverse fixed routes and make frequent stops at and/or in between subway stations along their routes. Much larger and heavier cargo trains also travel along fixed or variably fixed routes and may make frequent planned and/or unplanned stops, such as to pick up or unload cargo and at traffic signals. High-speed magnetic levitation (MagLev) trains, which utilize magnetic levitation to levitate, move, and direct trains at very high speeds and acceleration, are becoming increasingly used in many parts of the world, including North America, Europe, and Asia. Rollercoasters are an example of very fast ground transportation vehicles used in transporting persons back to the same point of origin, although such transportation generally involves much higher acceleration/deceleration and greater elevation changes, and are intended for a different purpose—thrill from the speed, high elevation drops, and quick and abrupt stops.

Differences between the various types of ground transportation vehicles, such as those described above, include the fundamentally distinct underlying systems and methods used to operate the vehicles, rate of acceleration, top speed, rate of deceleration, and overall mass of the collective vehicle. On the other hand, commonalities between the different types of ground transportation vehicles include the significant amount of energy expended to operate the vehicles, including starting, accelerating, decelerating, and stopping.

Despite recent advances in energy efficiency of ground transportation vehicles, including those pertaining to starting a vehicle from a stationary position, accelerating a vehicle, and maintaining speed of a moving vehicle, it is recognized herein that the operation of certain conventional vehicles can be improved, and overall energy consumption can be substantially reduced as a result.

SUMMARY

Present example embodiments relate generally to a ground transportation system for interacting with one or more vehicles such as the cars of a rollercoaster, where at least some of the vehicles comprise at least one magnetic element fixedly attached to them. These magnetic elements are operable to generate a magnetic field having a first magnitude and a first direction relative to the vehicles' motion.

Along the system's path, such as at points along a track for trains and rollercoasters or at other areas such as intersections, turns, inclines, declines, and traffic lights, the magnetic elements on the vehicles interact with one or more fixedly positioned magnetic coil assemblies fixedly positioned near the path or other area traversable by the vehicle. Such fixedly positioned magnetic coil assemblies comprise a core and a magnetic wire coil wrapped around the core, the magnetic coil assembly operable to generate a magnetic field having a second direction relative to the vehicles' motion.

Further included in the described ground transportation systems are one or more energy storage units operable to release energy to and store energy from the fixedly positioned magnetic coil assemblies. The vehicles are accordingly operable to accelerate when the vehicles are proximate to a magnetic coil assembly and when the energy storage unit releases energy to the magnetic coil assembly to generate the second-direction magnetic field. The vehicles are further operable to decelerate when the vehicles are proximate to a magnetic coil assembly and when the first-direction magnetic field causes the magnetic coil assembly to generate the second-direction magnetic field.

In another exemplary embodiment, a ground transportation system is operable to interact with vehicles that include at least one magnetic element fixedly attached to the vehicle. The magnetic element of the vehicle is operable to generate a magnetic field having a first magnitude and a first direction. Along the system's path, such as at points along a track for trains and rollercoasters or at other areas such as intersections, turns, inclines, declines, and traffic lights, one or more fixedly positioned magnetic coil assemblies are fixedly positioned near the path or other area traversable by the vehicle. Such fixedly positioned magnetic coil assemblies comprise a core and a magnetic wire coil wrapped around the core, the magnetic coil assembly operable to generate a magnetic field having a second direction relative to the vehicles' motion.

Further included in the described ground transportation systems are one or more energy storage units operable to release energy to and store energy from the fixedly positioned magnetic coil assemblies. The vehicles are accordingly operable to accelerate when the vehicles are proximate to a magnetic coil assembly and when the energy storage unit releases energy to the magnetic coil assembly to generate the second-direction magnetic field.

In another exemplary embodiment, a ground transportation system is operable to interact with vehicles that include at least one magnetic element fixedly attached to the vehicle. The magnetic element of the vehicle is operable to generate a magnetic field having a first magnitude and a first direction. Along the system's path, such as at points along a track for trains and rollercoasters or at other areas such as intersections, turns, inclines, declines, and traffic lights, one or more fixedly positioned magnetic coil assemblies are fixedly positioned near the path or other area traversable by the vehicle. Such fixedly positioned magnetic coil assemblies comprise a core and a magnetic wire coil wrapped around the core, the magnetic coil assembly operable to generate a magnetic field having a second direction relative to the vehicles' motion.

Further included in the described ground transportation systems are one or more energy storage units operable to release energy to and store energy from the fixedly positioned magnetic coil assemblies. The vehicles are accordingly operable to decelerate when the vehicles are proximate to a magnetic coil assembly and when the first-direction magnetic field causes the magnetic coil assembly to generate the second-direction magnetic field.

In another exemplary embodiment, a method is described for recovering energy from a moving ground transportation vehicle. The method includes a moving vehicle generating a first magnetic field having a first magnitude and a first direction. The first magnetic field of the moving vehicle induces an electric current and a second magnetic field having a second direction in a magnetic coil assembly. In this embodiment, the magnetic coil assembly is fixedly positioned at a stationary point within an area traversed by the vehicle. The magnetic coil assembly is operable to convert the induced electric current into energy storable in an energy storage unit.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and:

FIG. 2B is an exemplary embodiment of a magnetic coil assembly and energy storage assembly;

Although similar reference numbers may be used to refer to similar elements for convenience, it can be appreciated that each of the various example embodiments may be considered to be distinct variations.

DETAILED DESCRIPTION

Figure 1:
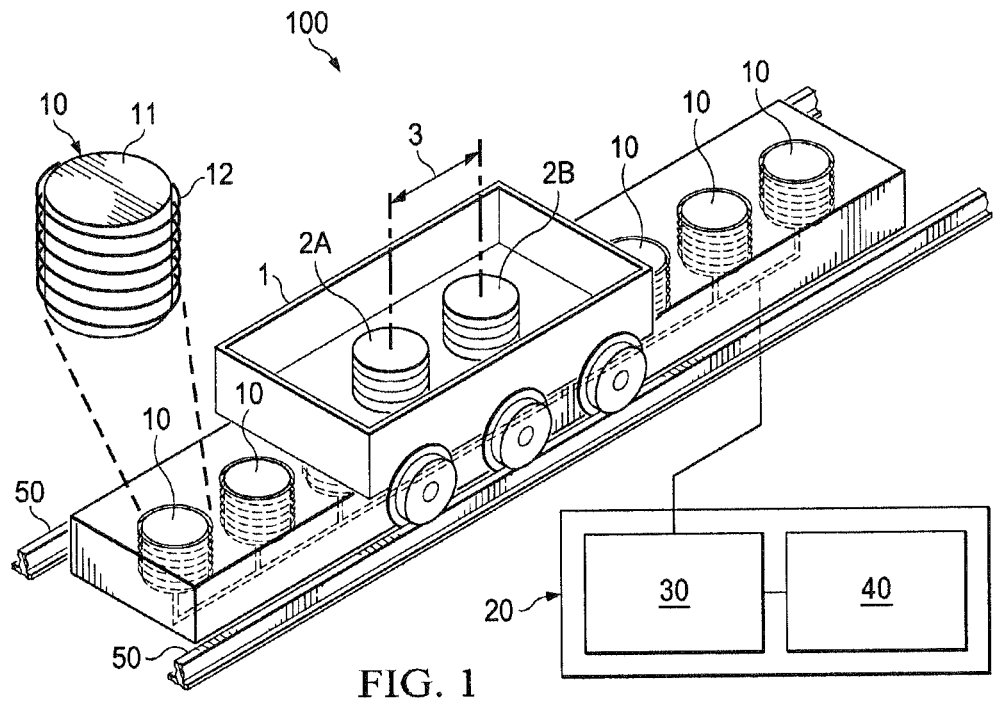
FIG. 1 is an exemplary embodiment of a system for energy regeneration comprising a ground transportation vehicle, magnetic coil assembly, and energy storage assembly.
Figure 2A:
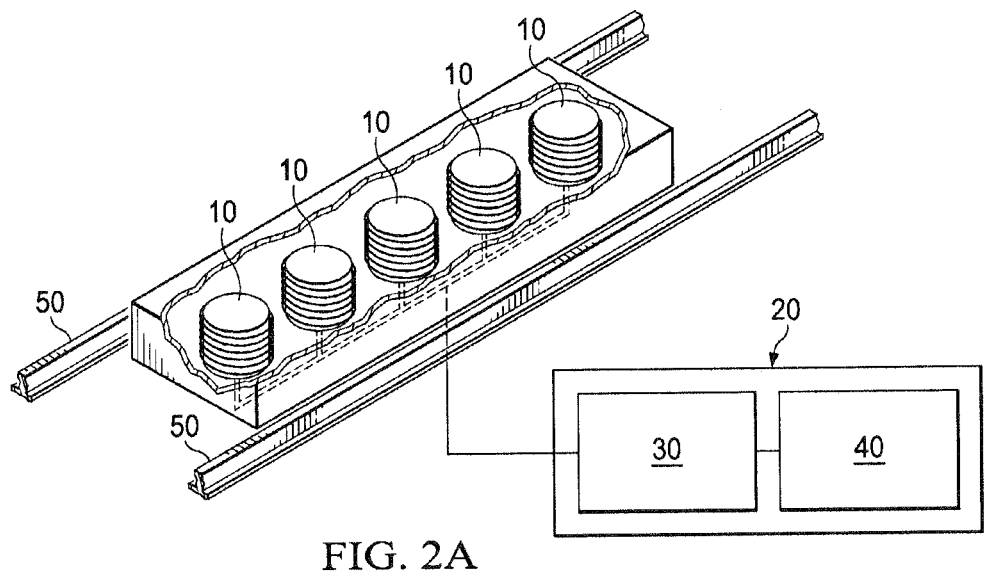
FIG. 2A is an exemplary embodiment of a magnetic coil assembly and energy storage assembly.

Example embodiments will now be described hereinafter with reference to the accompanying drawings, which form a part hereof, and which illustrate example embodiments which may be practiced. As used in the disclosures and the appended claims, the terms "example embodiment," "exemplary embodiment," and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Various methods and systems have been developed for use in operating the various different types of ground transportation vehicles, including fixed route and variably fixed-route vehicles such as trains and roller coasters. Hereinafter, references to "starting" a vehicle, or the like, will refer to moving and accelerating the vehicle from a stationary position; references to "accelerating" a vehicle, or the like, will refer to increasing the speed of a moving vehicle in the same direction of motion, and can also include starting a stationary vehicle in motion; references to "stopping" a vehicle, or the like, will refer to slowing or decelerating a non-stationary vehicle toward or to a stationary position; and references to "decelerating" a vehicle, or the like, will refer to decreasing the speed of a moving vehicle, and can also include bringing a moving vehicle toward or near a stationary position. Although example embodiments herein are described with reference to trains and/or rollercoasters, it is to be understood that example embodiments are also applicable to various other forms of ground transportation vehicles, including monorails, streetcars, and non-fixed route vehicles such as trucks and cars.

Examples of systems presently used to start certain ground transportation vehicles include motor-based systems, such as induction motor systems, hydraulic-based systems, flywheel-based systems, and mass-induced-based systems for rollercoasters, such as drop tower systems. Examples of present systems used to decelerate and stop certain ground transportation vehicles include friction-based systems, such as brake pads on the vehicles, skid braking systems, and fin braking systems.

As known in the art, induction motor-based systems are generally operable to start and accelerate movement of a vehicle by passing current from an energy source on the vehicle through a stator assembly (or conductor) so as to create a magnetic field opposite to an induced magnetic field of a corresponding rotor assembly (or reaction plate). During a start operation, a sufficient electric current is passed through the stator assembly, and a magnetic field becomes generated or induced by the stator assembly. The rotor assembly subsequently becomes induced with current in accordance with Lenz's law, and the rotor assembly is operable to generate an opposing magnetic field to the magnetic field generated by the stator assembly. The opposing magnetic fields cooperate to create a repulsive force operable to cause the vehicle to move in a particular direction. In practice, the stator assembly will comprise a plurality of stator elements arranged adjacent to each other so as to cooperatively repel, or "push," and to start and/or increase the acceleration of the vehicle in a specified direction.

Induction motor-based systems have emerged as the system of choice for certain ground transportation vehicles due to, among other reasons, lower energy consumption, achievable high acceleration, and the ability to control the start and acceleration of the vehicle by varying the strength of the magnetic fields, which relates directly to the amount of current provided to the stator assembly.

In contrast, hydraulic-based start systems are generally known in the art to operate on the general principle of storing energy into one or more hydraulic accumulators. Each hydraulic accumulator comprises a piston operable to separate hydraulic fluid from a gas, such as nitrogen. In operation, hydraulic fluid is injected from a hydraulic storage tank into one side of the piston, thereby compressing the other side comprising the gas. To create acceleration, the highly pressurized hydraulic fluid is released from the hydraulic accumulators into motors on a large winch. A cable is wound around the winch and attached to a catch car, which is attached to the vehicle, such as a train. Once the vehicle reaches a certain speed, the catch car releases from the vehicle and returns to its original position.

Presently, ground transportation vehicles, such as trains and rollercoasters, achieve deceleration and stopping using various different types of friction-based braking systems. In general, friction-based systems operate under substantively the same principle as those used in automobiles, comprising a stationary surface (such as a brake pad in a car) operable to be pressed by the operator against a moving surface (such as a wheel of a car). Friction is then created so as to reduce the relative motion of and/or stop the vehicle. In respect to trains, the braking system is generally mounted on the train itself in a manner similar to a car, and the brakes are applied directly to the wheels of the train when deceleration or stopping is desired. In respect to rollercoasters, fin brakes are presently the most popular type of friction-based braking system. In general, a fin brake system comprises a fin on the underside of the rollercoaster vehicle and friction pads on the rails of the rollercoaster track. To stop the rollercoaster vehicle, the friction pads are operable to squeeze the fin as the vehicle passes by so as to slow down or stop the vehicle. Skid brakes, which were popular prior to the widespread use of fin brakes and are still used in some rollercoasters today, generally comprise one or more elongated strips of material, such as wood, that are positioned near or in between the rails of the track. In operation, to stop an incoming train or rollercoaster, the strips are operable to be pushed upwards so as to make contact with the underside of the moving vehicle and bring the vehicle to a stop.

A common disadvantage of conventional friction-based braking systems, including those described above, include the variances in braking performance and effectiveness, such as those caused when environmental conditions, such as rain, snow, or heat, are not ideal.

It is recognized herein that the various types of ground transportation vehicles in use today, including those described above, operate on fundamentally distinct underlying systems and methods. Selection from among the various different technologies is generally based on the required or anticipated rates of acceleration/deceleration, top speed, weight/size/quantity of cargo and/or passengers, travel conditions (such as environmental conditions), elevation changes, etc. Many of these vehicles, particularly those requiring fast acceleration/deceleration, heavy cargo loads, large number of passengers, and/or steep elevation changes, require a significant amount of energy to start and accelerate the vehicle.

Despite recent advances in energy efficiency, including those pertaining to starting a vehicle from a stationary position and accelerating the vehicle, it is recognized herein that certain conventional ground transportation systems can be operationally improved, and overall energy consumption can be substantially reduced as a result.

FIGS. 1, 2A-B, 3A-B, 4A-B, and 5-7 depict example embodiments of ground transportation system 100 comprising ground transportation vehicle 1 having one or more magnetic elements (here illustrated as two magnetic elements 2A and 2B), at least one magnetic coil assembly 10 fixedly installed in an adjacent and spaced out manner along travel route 50 (here illustrated as a plurality of magnetic coil assemblies along rails of a track) at one or more predetermined points (such as a station, a traffic light, an area having a different speed limit, or an area having a change in elevation), and energy storage assembly 20 comprising transformer/rectifier unit 30 and storage unit 40.

Figure 4A:
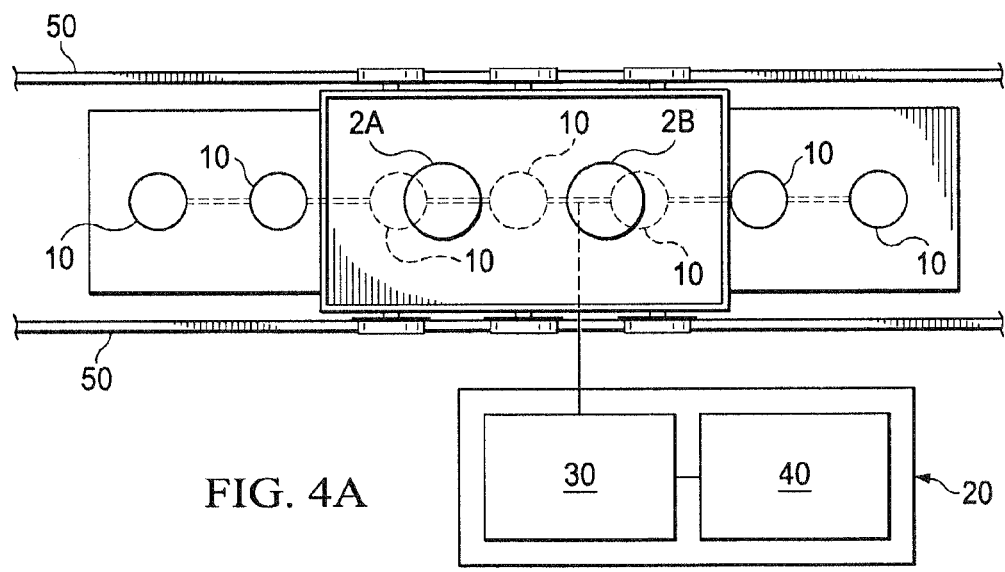
FIG. 4A is an exemplary embodiment of a system for energy regeneration comprising a ground transportation vehicle, magnetic coil assembly, and energy storage assembly.
Figure 4B:
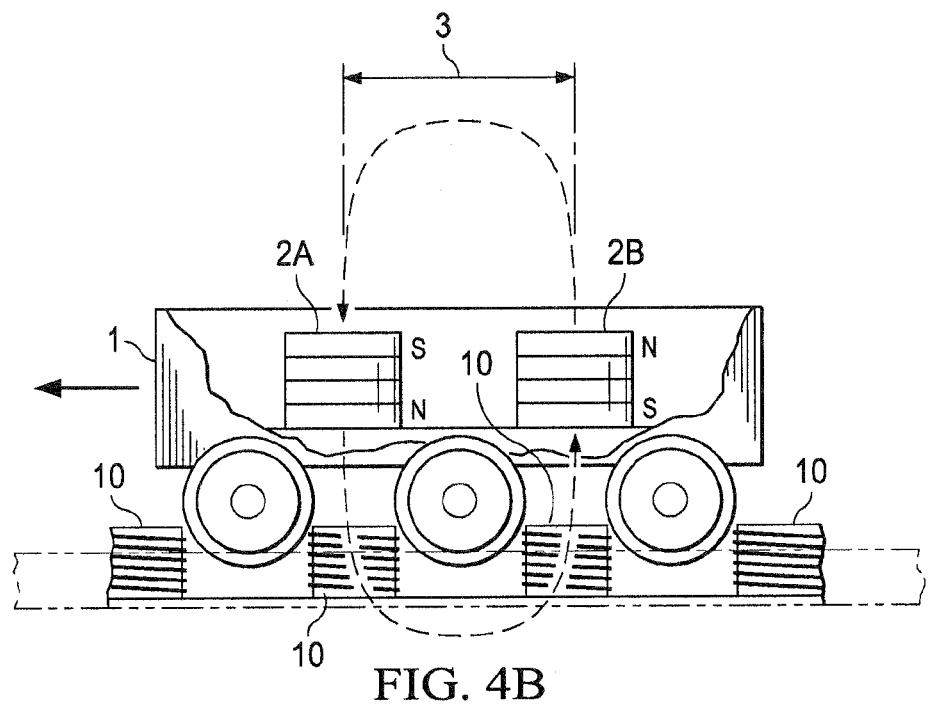
FIG. 4B is an exemplary embodiment of a system for energy regeneration comprising a ground transportation vehicle, magnetic coil assembly, and energy storage assembly.

Ground transportation vehicle 1 comprises one or more magnetic elements 2A and 2B, each of which can comprise one or more strong permanent magnets, electromagnets, a combination of permanent magnets and electromagnets, or the like, mounted near or adjacent to a side, such as the underside, of vehicle 1. In an example embodiment, as illustrated in FIG. 4B, vehicle 1 comprises two magnetic elements 2A and 2B fixedly arranged in an adjacent and spaced out 3 manner. It is to be understood that some example embodiments can comprise more than two magnetic elements arranged in one or a plurality of rows. Each of the magnetic elements 2A and 2B comprise at least one magnetic element stacked in such a way that the orientation of the collective stack of magnetic elements has either like or opposing poles. In an example embodiment shown in FIG. 4B wherein magnetic coil assemblies 10 are fixedly installed directly under the path of movement of vehicle 1 on route 50, each of the magnetic elements 2A and 2B are mounted on or proximate to the underside of vehicle 1 and comprise four magnetic elements stacked in such a way that the orientation of the collective stack of magnetic elements have opposing poles. It is recognized herein that such a configuration has been found to provide for improved energy consumption, efficiency, and recovery (to be described later).

Figure 3A:
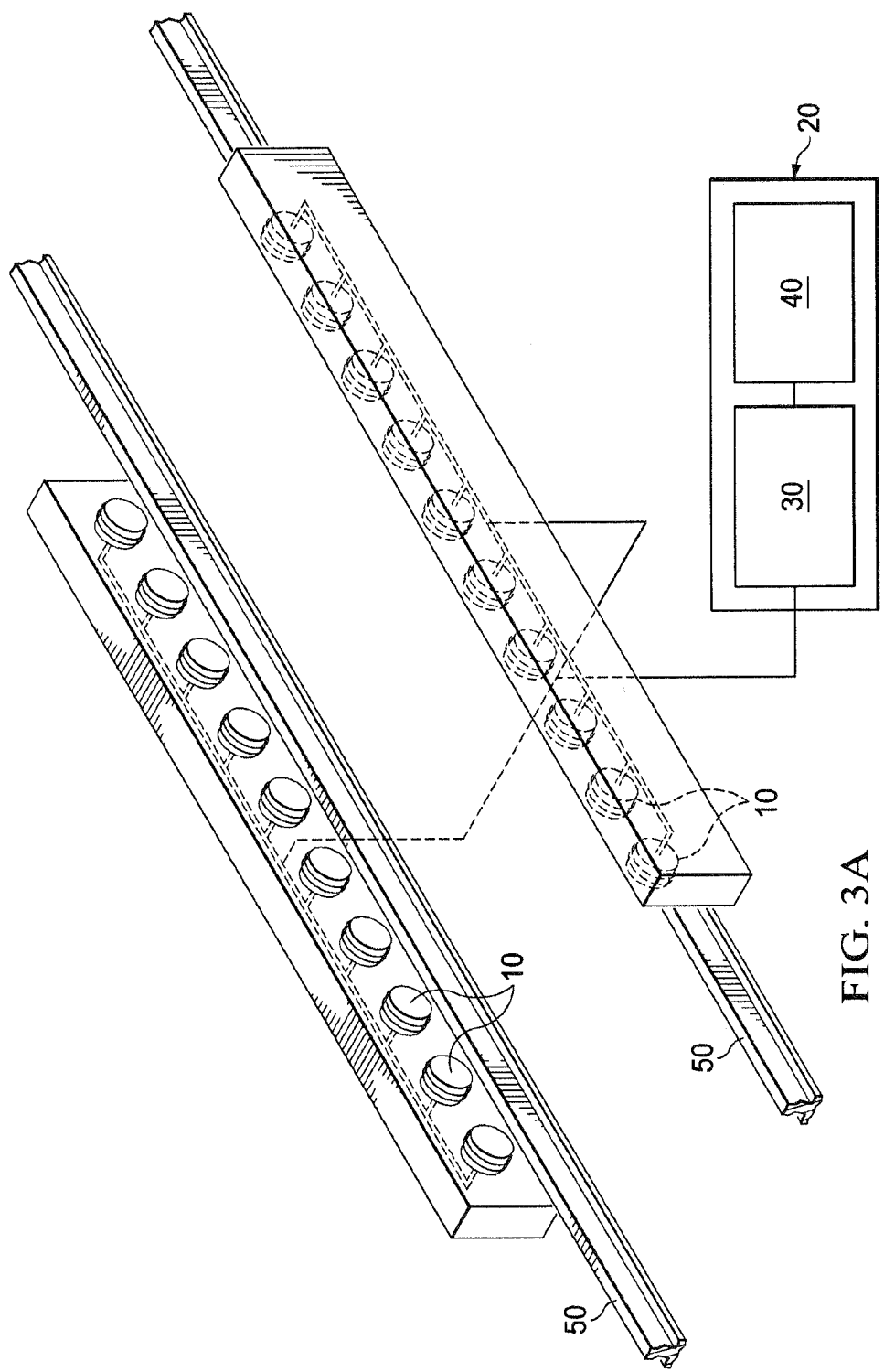
FIG. 3A is an exemplary embodiment of a magnetic coil assembly and energy storage assembly.
Figure 3B:
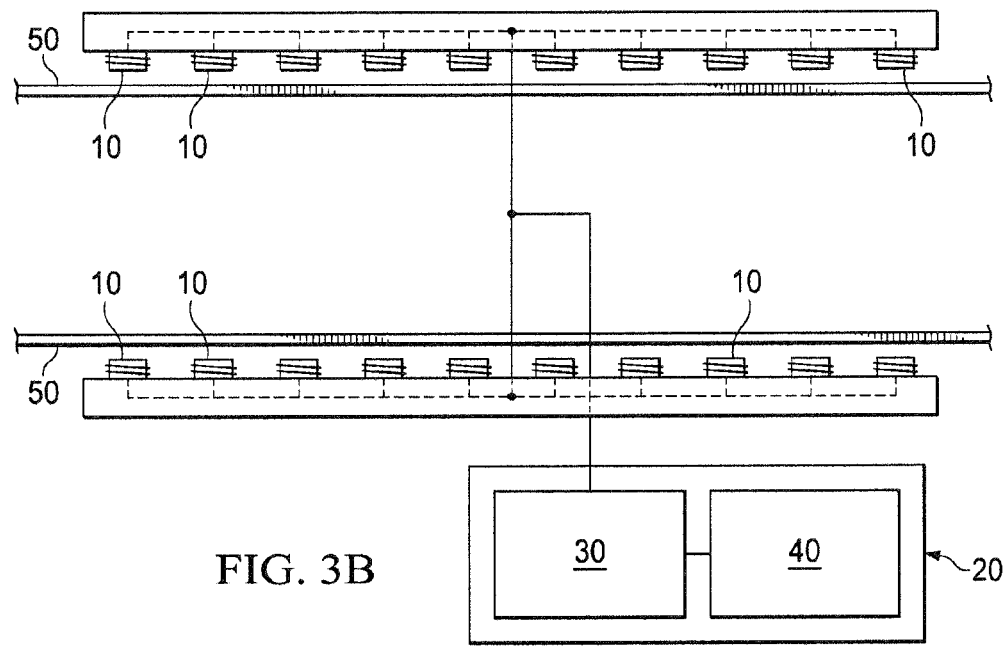
FIG. 3B is an exemplary embodiment of a magnetic coil assembly and energy storage assembly.

In an example embodiment, each of the magnetic coil assemblies 10 comprise a core 11 having a width, of the core 11 comprising material(s) capable of having electromagnetic properties under an electric field, or the like, and a series of magnetic wire coils 12 wrapped around the core 11. Example materials of the magnetic coil assemblies 10 include magnetic material(s), material(s) capable of having electromagnetic properties under an electric field, highly permeable material(s), rare earth metals such as neodymium, samarium, yttrium, lanthanum, praseodymium, promethium, gadolinium, and dysprosium, aluminum, electrically insulative ferrite, iron, cobalt, nickel, manganese, chromium, and metamaterials. It is to be understood that the above example materials have been presented by way of example only, and are not limiting. Thus, the breadth and scope of the example embodiments described herein should not be limited by any of the above-described materials. In an example embodiment, the magnetic coil assemblies 10 are fixedly positioned in a row-like manner in the direction of route 50 and along route 50, as illustrated in example embodiments of FIGS. 1, 2A-B, 4A-B, and 5-7. In this regard, the row of magnetic coil assemblies can be installed in such a way as to interact with the one or more magnetic elements of vehicle 1 (stationary and moving). It is to be understood that example embodiments can comprise at least one of such rows of magnetic coil assemblies installed in such a way as to interact with the one or more magnetic elements of vehicle 1 (stationary and moving). In some embodiments, the magnetic coil assemblies 10 can also be fixedly positioned in the direction of route 50 and on the sides of route 50, as illustrated in FIGS. 3A-B. In such an embodiment, the magnetic elements 2A and 2B of vehicle 1 can be correspondingly fixedly positioned on the sides of vehicle 1. In some embodiments, magnetic coil assemblies 10 can also be fixedly positioned both directly under the path of movement of vehicle 1 on route 50 and on the sides of route 50 (not illustrated). In such an embodiment, the magnetic elements 2A and 2B of vehicle 1 will be correspondingly fixedly positioned near the underside and/or on the sides of vehicle 1. In an example embodiment, the magnetic elements 2A and 2B are positioned 3 in such a way that the spacing is equal to approximately half the width of the core 11, which is recognized herein to provide for improved energy consumption, efficiency, and recovery (to be described later).

During a start and/or acceleration operation, energy stored in storage unit 40 is converted by energy storage assembly 20 to kinetic energy for vehicle 1. Specifically, the stored energy "activates" one or more magnetic coil assemblies 10, including those proximate to stationary vehicle 1 (under, sides, and/or top of vehicle 1), by supplying electric current to the magnetic wire coils 12 of said one or more magnetic coil assemblies 10. In some embodiments, a transformer/rectifier unit 30 is provided between the magnetic coil assemblies 10 and the energy storage unit 40. As illustrated in the example embodiment of FIG. 4B, a magnetic field becomes generated by the magnetic coil assemblies 10 as a result. The cores 11 of the activated magnetic coil assemblies 10 direct the magnetic field toward the magnetic elements 2A and 2B of vehicle 1. It is to be understood herein that the strength and direction of the magnetic field can be varied and/or flipped by, among other ways, varying the strength, impedance/load, and/or direction of the supplied electric current. Such can be predetermined/preset, selectable based on the desired direction of motion of vehicle 1, and/or automatically determined/set based on, among other things, the desired vehicle speed/acceleration, vehicle weight, known or expected route, known or expected travel conditions, known or expected elevation changes, etc. Correspondingly, magnetic elements 2A and 2B of vehicle 1 are operable to generate an opposing magnetic field to the magnetic field generated by the activated magnetic coil assemblies 10. The opposing magnetic fields create a repulsive force operable to push vehicle 1 in a specified direction, thereby transferring energy to vehicle 1 in the form of kinetic energy. In example embodiments, the magnetic field generated by magnetic elements 2A and 2B of vehicle 1 can be persistent/continuous (ex. when magnetic elements 2A and 2B are permanent magnets, always-on electromagnets, or the like) and/or switchably or variably controllable (ex. when magnetic elements 2A and 2B are electromagnets, permanent magnets that can be magnetically shielded, a combination of electromagnets and permanent magnets, or the like). The activated magnetic coil assemblies 10 that become positioned near, adjacent or proximate to vehicle 1 (such as under or on the sides of vehicle 1) as vehicle 1 moves/accelerates forward are operable to cooperatively increase the acceleration of vehicle 1 by converting and transferring additional energy to vehicle 1.

Figure 8:
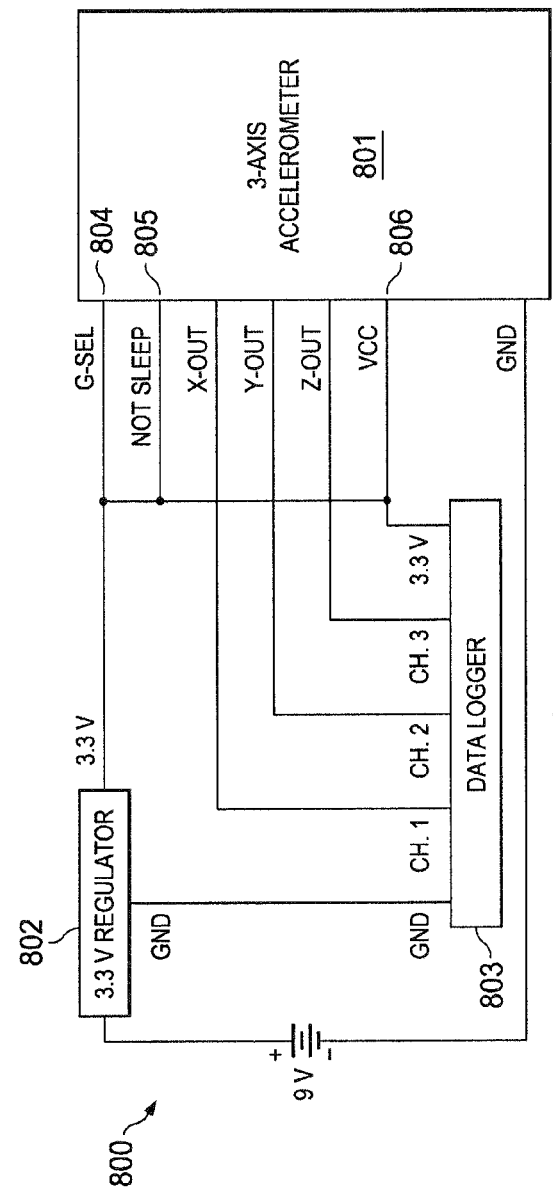
FIG. 8 is an exemplary embodiment of instrumentation operable to measure acceleration.

In example implementations conducted on vehicles, such as rollercoasters, the acceleration and deceleration of the vehicles were measured using a portable accelerometer instrument 800, as illustrated in FIG. 8, capable of recording acceleration and time histories. Referring to FIG. 8, the 3-axis accelerometer 801 used for the instrumentation package was an MMA7361 from Freescale. The operating voltage (VCC input 806) of the accelerometer 801 was set to 3.3V to match the data logger 803. The G-SEL 804 input of the accelerometer 801, which sets the upper bound of readable accelerations, was set at VCC. The SLEEP input 805, which initiates the accelerometer 801, was also set at VCC. As with most accelerometers, the MMA7361 typically records a negative 1 g from the earth's gravitational field. In this regard, the negative 1 g signal was used to calibrate the accelerometer 801 and determine its initial orientation. The data logger 803, the Logomatic v2, was powered by a 3.3V voltage regulator 802. In a three-channel configuration, the maximum sampling rate was 500 Hz and the specified sampling rate was 400 Hz. Data from the data logger 803 was stored in a memory (not shown), such as an SD card. The system was calibrated by placing the system perpendicular to the earth's gravitational field in the positive and negative x, y, and z directions.

It is recognized herein that the at least one magnetic coil assembly 10, which as described above are adjacently positioned in a spaced manner 3 along route 50, can cooperate to achieve high acceleration rates and top speeds in an energy efficient manner. This is achievable by appropriately selecting system parameters and configurations based on, among other things, required or anticipated rates of acceleration, top speed, weight/size of cargo, number of passengers, travel conditions (such as environmental conditions), elevation changes, etc. Selectable system parameters and configurations can include the number of operable magnetic elements in the vehicle (an example implementation for varying the number of operable magnetic elements may include magnetically shielding those magnetic elements that are not required, and/or using electromagnets), the number of magnetic units in each magnetic element, the collective strength of each magnetic element, the orientation and/or positioning of the magnetic elements relative to each other, matching of magnetic coil impedances to the load impedance of the source (for a start operation, the source is storage unit 40; for a stop operation, which will be described later, the source is also storage unit 40), and changing of the size of air gaps between the magnetic elements of vehicle 1 and magnetic coil assemblies 10. It is also recognized herein that the start and acceleration of vehicle 1 is effectively a byproduct of the conversion and transfer of energy stored in energy storage assembly 20 to kinetic energy for vehicle 1.

In an example embodiment, system 100 is operable to recover energy from a moving vehicle 1 in a deceleration and/or stopping operation. Energy recovery is achievable by drawing/transferring the kinetic energy of moving vehicle 1 using magnetic coil assemblies 10, and converting the kinetic energy using energy storage assembly 20 into energy storable into storage unit 40. More specifically, as moving vehicle 1 approaches the at least one magnetic coil assembly 10, the magnetic field of moving magnetic elements 2A and 2B induces an opposing magnetic field and an electric current in the first of the at least one magnetic coil assemblies 10, thereby creating a reverse push (push in the opposite direction of movement of the vehicle) onto vehicle 1 and causing vehicle 1 to decelerate. As the decelerated but still moving vehicle 1 continues to move, the next adjacent magnetic coil assembly 10 also become induced with an opposing magnetic field and an electric current, thereby creating additional reverse push onto vehicle 1 and causing vehicle 1 to further decelerate. In an example embodiment, this continues for subsequent adjacent magnetic coil assemblies 10 until the vehicle 1 comes to a stop. An electric current is induced/generated by each of the induced magnetic fields in the at least one magnetic coil assemblies 10 in their respective magnetic wire coils 12, and the generated electric current is provided to storage unit 40. In example embodiments, a transformer/rectifier unit 30 is provided between magnetic coil assemblies 10 and energy storage unit 40. It is recognized herein that the amount of recoverable energy of an incoming moving vehicle 1 is directly related to the speed, acceleration/deceleration, and mass of vehicle 1 as it approaches the magnetic coil assemblies 10, as represented in the following kinetic energy equation:

$$\text{Kinetic Energy (KE)} = \tfrac{1}{2}mv^2, \tag{1}$$

wherein m represents the mass of vehicle 1 and v represents the velocity/speed of vehicle 1 when vehicle 1 is proximate to the point of energy transfer.

As such, in a deceleration and/or stopping operation, a vehicle 1 such as a train or rollercoaster 1 approaching a series of magnetic coil assemblies 10 at a high speed can provide for significant energy recovery, as reflected in the above equation, since the energy drawn/transferred, converted, and recovered will be directly related to the speed, acceleration/deceleration, and mass of vehicle 1. In a similar manner, a train carrying very heavy cargo loads approaching a series of magnetic coil assemblies 10 at even a lower speed can also provide for significant energy recovery and storage, as reflected in the above equation, since the energy recovery will be directly proportional to the mass (and speed, acceleration/deceleration) of the vehicle 1. Specifically, the strength/magnitude of the induced magnetic fields and electric current at the magnetic coil assemblies will be related to the amount of kinetic energy drawable/transferable from the incoming moving vehicle 1.

It is recognized herein that the at least one magnetic coil assemblies 10, which as described above are adjacently positioned along route 50, can cooperate to achieve high deceleration rates and quick stopping of the moving vehicle 1 so as to maximize energy recovery. This is achievable by appropriately selecting system parameters and configurations based on, among other things, required or anticipated incoming speeds, deceleration rates, weight/size of cargo, number of passengers, travel conditions (such as environmental conditions), elevation changes, etc. Selectable system parameters can include the number of operable magnetic elements in the vehicle, the number of magnetic units in each magnetic element, the collective strength of each magnetic element, the orientation and/or positioning of the magnetic elements relative to each other, matching of magnetic coil impedances to the load impedance of the source (for a stop operation, the source is storage unit 40; for a start operation, the source is storage unit 40), and changing of the size of air gaps between the magnetic elements of vehicle 1 and magnetic coil assemblies 10.

It is also recognized herein that the deceleration and stopping of vehicle 1 in example embodiments are not a result of friction, as implemented in conventional friction-based braking systems. Rather, deceleration and stopping in example embodiments are effectively a byproduct of the transfer and conversion of kinetic energy of moving vehicle 1 to energy storable in energy storage assembly 20. In this regard, example embodiments are operable to eliminate or substantially reduce the undesirable effects inherent in conventional friction-based braking systems, such as those caused by environmental conditions, on the performance and effectiveness of braking. A more significant advantage of example embodiments over conventional friction-based braking systems, however, includes the converting of kinetic energy of moving vehicle 1 into storable energy for reuse in starting and/or accelerating vehicle 1 or any other vehicle.

In example embodiments, a start operation, an acceleration operation, a deceleration operation, and/or a stop operation can be implemented using the same system. In further exemplary embodiments, an energy monitoring system can be implemented that would provide a graphical illustration to users and/or administrators of the vehicle system (such as a roller coaster ride) of the energy being generated, consumed, and/or saved, including the energy saved relative to conventional systems, such as those incorporating only conventional induction motor-based systems and a pure friction braking system. In this way, the administrator can fine-tune the operation of the system to maximize energy savings, and the graphical energy displays presented to the users can be used to build awareness of the energy savings and to generate enthusiasm for alternative energy sources and efficient systems.

Figure 5:
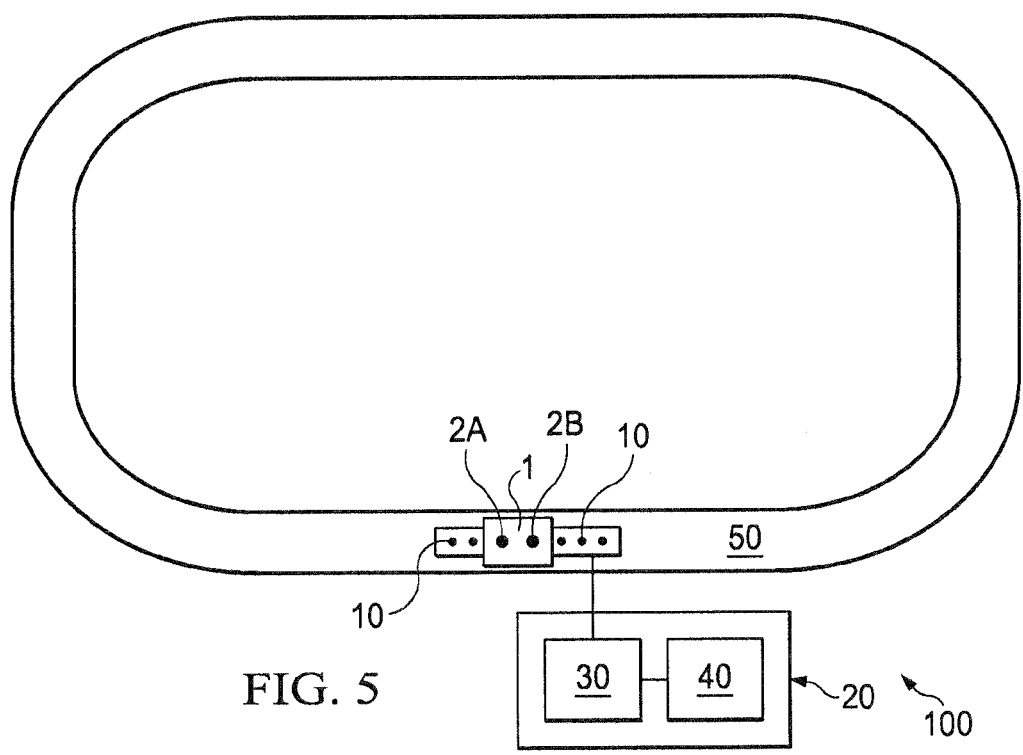
FIG. 5 is an exemplary embodiment of a system for energy regeneration comprising a ground transportation vehicle, magnetic coil assembly, and energy storage assembly.

FIG. 5 depicts an example embodiment of a fixed route ground transportation system 100 formed in a closed-ended manner. System 100 is operable to perform a start operation, an acceleration operation, a deceleration operation, and/or a stop operation using the same system 100.

In operation, the starting and/or accelerating of vehicle 1 of FIG. 5 is achievable by using the energy stored in storage unit 40 to pass electric current through transformer/rectifier unit 30 and onto magnetic coil assemblies 10. A magnetic field is generated by magnetic coil assemblies 10 as a result of the electric current. In an example embodiment, the strength and/or direction of the magnetic field are adjustable based on, among other things, the weight of the vehicle, desired speed/acceleration, and/or expected route (such as direction, elevation changes, environmental conditions, etc.). In an example embodiment, the magnetic elements 2A and 2B of vehicle 1 are also adjustable, moveable, and/or positionable based on, among other things, the weight of the vehicle, desired speed/acceleration, and/or expected route (such as direction, elevation changes, environmental conditions, etc.). In an example embodiment, the strength and/or direction of the magnetic field generated by the magnetic coil assemblies 10 and/or the magnetic strength and/or direction of the magnetic field generated by magnetic elements 2A and 2B are adjustable in such a way that the magnetic fields of magnetic coil assemblies 10 and magnetic elements 2A and 2B are opposing and may be of approximately the same strength/magnitude. As described earlier, this opposing magnetic field effectively creates the repulsive force necessary to start and/or accelerate vehicle 1 in a specific direction.

Upon traversing the route 50 and returning back to the point of origin, the magnetic field generated by magnetic elements 2A and 2B is operable to induce magnetic coil assemblies 10 to generate an opposing magnetic field and an electric current. The opposing magnetic fields are operable to push moving vehicle 1 in the opposite direction of motion, thereby causing deceleration of vehicle 1. Subsequently adjacent magnetic coil assemblies 10 that come under magnetic elements 2A and 2B as vehicle 1 continues to move also become induced by the magnetic field of magnetic elements 2A and 2B, and also generate opposing magnetic fields (and an electric current) operable to further decelerate, and eventually stop, vehicle 1. As described above, the induced magnetic fields of the magnetic coil assemblies each generate electric current storable in storage unit 40.

In example embodiments, a secondary or "end-of-line" braking system (not shown), such as an eddy current braking system, a friction-based braking system, or the like, is operable to assist system 100 in bringing a substantially decelerated vehicle 1 to a quick and complete stop. The end-of-line braking system can be for use as a secondary/emergency brake and/or to allow better stopping precision. Such end-of-line braking systems can be utilized after incoming vehicle 1 has been substantially decelerated by the above example embodiments, that is, when most of the kinetic energy from vehicle 1 has already been recovered.

It is recognized herein that system 100 of FIG. 5 is operable to recover most or a substantial amount of the energy expended in starting and accelerating vehicle 1 during the deceleration and stopping operation. Such recovered energy is then available for use in starting and accelerating vehicle 1 (or other vehicles) in subsequent start operations.

Figure 6:
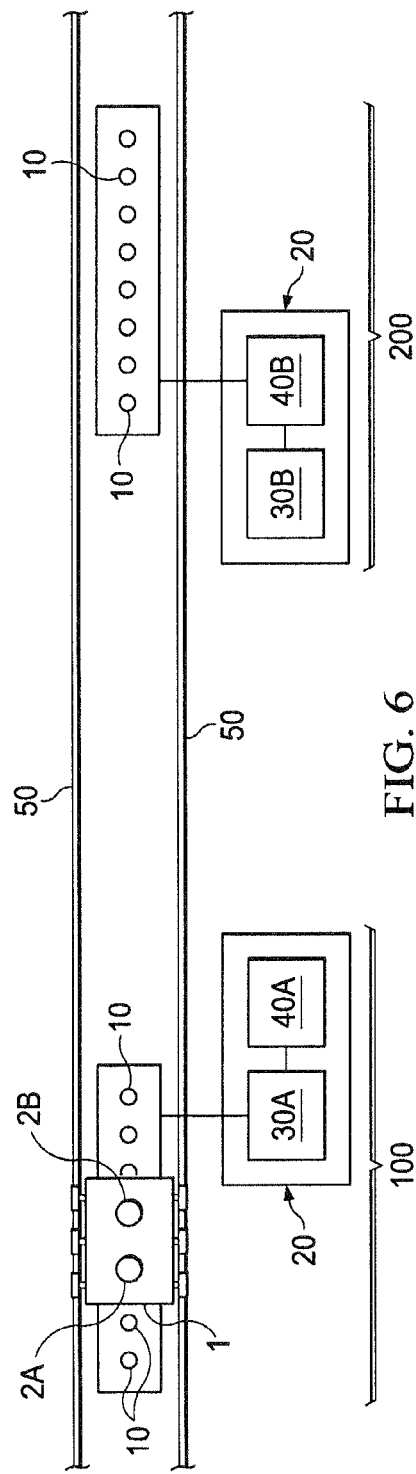
FIG. 6 is an exemplary embodiment of a system for energy regeneration comprising a ground transportation vehicle, magnetic coil assembly, and energy storage assembly.

FIG. 6 depicts an example embodiment of a cooperation of systems 100 and 200 along a fixed open-ended route, each system operable to perform a start operation, an acceleration operation, a deceleration operation, and/or a stop operation using the same system. As shown, system 100 is operable to start and accelerate vehicle 1 in the same manner as described for system 100 of FIG. 5. System 200 is operable to decelerate and stop incoming vehicle 1 in the same manner as described for system 100 of FIG. 5. System 200 is also operable to start and accelerate stationary vehicle 1 in the same manner, but opposite direction, as described for system 100 of FIG. 5. As described above, reversing the direction of travel at system 200 is achievable by reversing the direction of the magnetic field generated by magnetic coil assemblies 10. Reversing the direction of travel can also be achievable in other ways, including adjusting, moving, and/or positioning magnetic elements 2A and 2B of vehicle 1. As described earlier, the opposing magnetic fields effectively create the repulsive force necessary to start and accelerate vehicle 1 in the opposite direction and back towards system 100.

Figure 7:
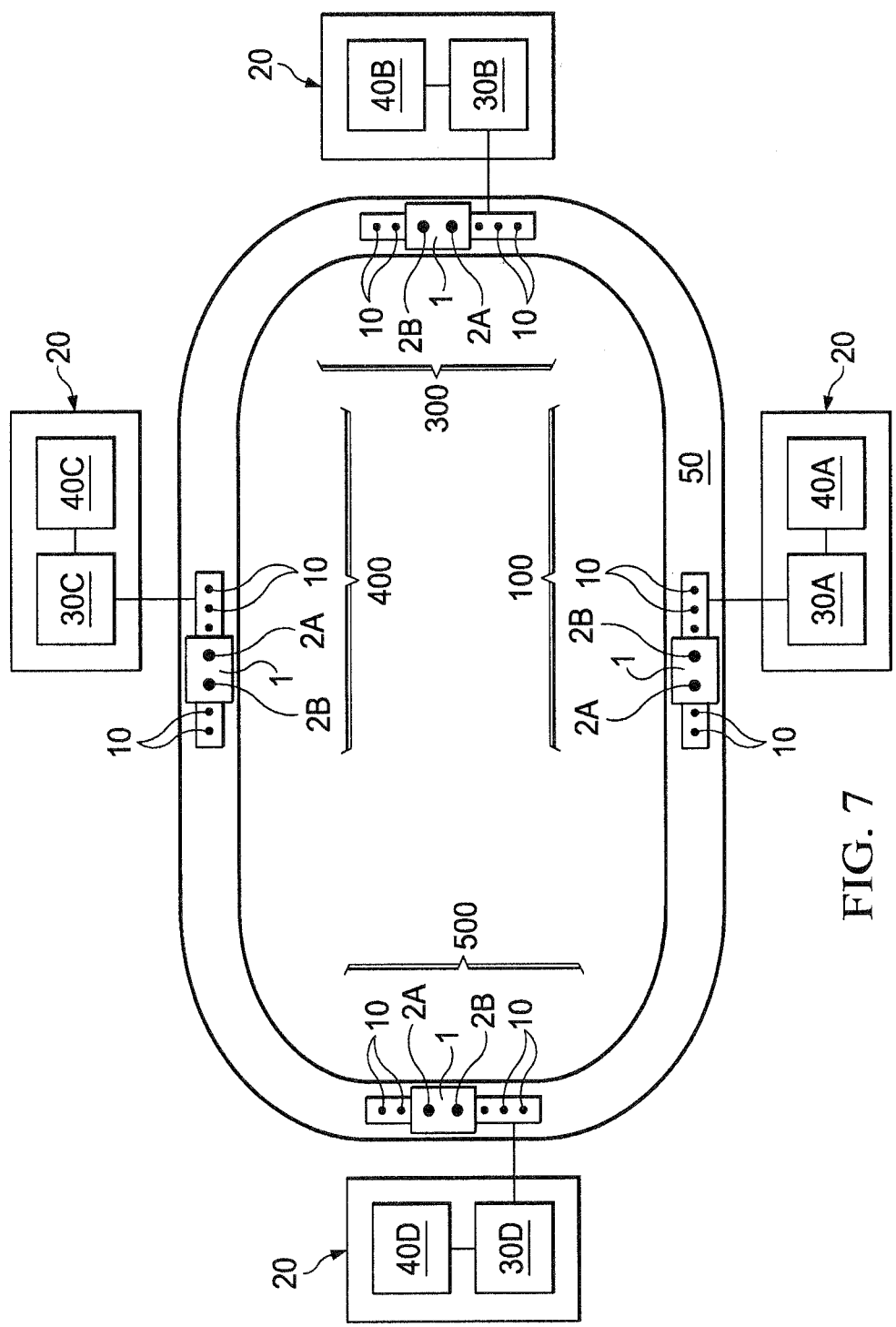
FIG. 7 is an exemplary embodiment of a system for energy regeneration comprising a ground transportation vehicle, magnetic coil assembly, and energy storage assembly.

FIG. 7 depicts an example embodiment of a cooperation of systems 100, 300, 400 and 500 along a fixed closed-ended route, each system operable to perform a start operation, an acceleration operation, a deceleration operation, and/or a stop operation using the same system. As shown, system 100 is operable to start and accelerate vehicle 1 in the same manner as described for system 100 of FIG. 5. System 300 is operable to decelerate and stop incoming vehicle 1 in the same manner as described for system 100 of FIG. 5. System 300 is also operable to start and accelerate stationary vehicle 1 in the same manner as described for system 100 of FIG. 5. Systems 400 and 500 are operable to decelerate/stop and subsequently start/accelerate vehicle in the same manner as described for system 300. It is recognized herein that systems 100, 300, 400 and 500 of FIG. 7 are operable to recover most or a substantial amount of the energy expended by another system in starting and accelerating vehicle 1. Such recovered energy is then available for use in starting and/or accelerating vehicle 1 (or other vehicles) in subsequent start operations. It is also recognized that the direction of travel of vehicle 1 between any of systems 100, 300, 400, and 500 can be reversed in a similar manner as described in system 200 of FIG. 6.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for accelerating and decelerating a vehicle, the vehicle including a first magnet mounted thereon, the first magnet being an electro-magnet generating a vehicle magnetic field, the method comprising:
   positioning a plurality of stationary second magnets along a path of the vehicle, the second magnets being electro-magnets;

selecting, to decelerate the vehicle, a first subset of the second electro-magnets based on a desired deceleration of the vehicle;

generating, by the first magnet, an electric current having a magnitude calculated to generate in the first subset of second magnets, an induced magnetic field opposed to the first magnetic field as the vehicle passes the first subset of second magnets, a magnitude of the induced magnetic field being selected to achieve the desired deceleration of the vehicle;

selecting, to accelerate the vehicle, a second subset of the second magnets based on a desired acceleration of the vehicle; and providing to the second subset of the second magnets an electric current controlled to create a generated magnetic field having a magnitude selected to achieve the desired acceleration of the vehicle.

2. The method of claim 1, wherein the induced magnetic field has a direction perpendicular to the path of the vehicle.

3. The method of claim 1, wherein the induced magnetic field and the desired deceleration have a direct relationship and wherein the induced magnetic field and the electric current have an indirect relationship.

4. The method of claim 1, further comprising controlling the first magnet, when decelerating the vehicle, so that the vehicle magnetic field is oriented relative to the induced magnetic field to achieve the desired deceleration and controlling the first magnet, when accelerating the vehicle, so that the vehicle magnetic field is oriented relative to the generated magnetic field to achieve the desired acceleration.

5. The method of claim 1, wherein, when accelerating the vehicle, a magnitude of the vehicle magnetic field is substantially equal to a magnitude of the generated magnetic field.

6. The method of claim 1, wherein the first subset of the second magnets is selected to maximize the electric current induced therein.

7. The method of claim 1, further comprising, when decelerating the vehicle, converting an electric current induced in the first subset of the second magnets into energy storable in an energy storage unit coupled to the second magnets.

8. The method of claim 1, wherein each of the second magnets includes a core and magnetic wire coils wrapped around the core and wherein the first magnet includes a first magnetic element and a second magnetic element.

9. The method of claim 8, wherein the first magnetic element is spaced from the second magnetic element by a distance of approximately half of a width of the core of one of the second magnets.

10. The method of claim 1, wherein the second magnets are positioned adjacent to the path of the vehicle.

11. The method of claim 1, wherein, when decelerating the vehicle, the induced magnetic field has a first direction and, when accelerating the vehicle, the generated magnetic field has a second direction opposite to the first direction.

12. The method of claim 11, wherein, when decelerating the vehicle, the vehicle magnetic field has a third direction opposite to the first direction and, when accelerating the vehicle, the vehicle magnetic field has a fourth direction opposite to the second direction.

* * * * *